(12) United States Patent
Lee

(10) Patent No.: US 7,023,511 B1
(45) Date of Patent: Apr. 4, 2006

(54) TRANSFLECTIVE LIQUID CRYSTAL DISPLAY DEVICE

(75) Inventor: Dong-Hoon Lee, Kyoungsangbuk-do (KR)

(73) Assignee: LG. Philips LCD Co., Ltd., Seoul (KR)

(*) Notice: Subject to any disclaimer, the term of this patent is extended or adjusted under 35 U.S.C. 154(b) by 101 days.

(21) Appl. No.: 09/621,281

(22) Filed: Jul. 20, 2000

(30) Foreign Application Priority Data

Jul. 20, 1999 (KR) .................... 10-1999-0029221

(51) Int. Cl.
*G02F 1/1335* (2006.01)

(52) U.S. Cl. .................. 349/114; 349/112; 349/113

(58) Field of Classification Search ............... 349/113, 349/112, 114
See application file for complete search history.

(56) References Cited

U.S. PATENT DOCUMENTS

| | | | | |
|---|---|---|---|---|
| 4,398,805 A | * | 8/1983 | Cole | 350/345 |
| 4,904,060 A | * | 2/1990 | Grupp | 350/339 |
| 5,620,348 A | * | 4/1997 | Sanatana et al. | 445/24 |
| 5,821,867 A | * | 10/1998 | Angell et al. | 340/815.45 |
| 6,204,903 B1 | * | 3/2001 | Hayashi et al. | 349/113 |
| 6,295,109 B1 | * | 9/2001 | Kubo et al. | 349/119 |

FOREIGN PATENT DOCUMENTS

JP       3228027      * 9/1991

* cited by examiner

*Primary Examiner*—Andrew Schechter
*Assistant Examiner*—Hoan C. Nguyen
(74) *Attorney, Agent, or Firm*—Birch, Stewart, Kolasch & Birch, LLP

(57) ABSTRACT

A transflective liquid crystal display device, including: a liquid crystal display panel having a first transparent substrate, a second transparent substrate, and a liquid crystal layer interposed between the first and second transparent substrates, the first transparent substrate having a color filter, the second transparent substrate having a pixel electrode and a reflector, the reflector having a light transmitting hole which the pixel electrode covers, and the light transmitting hole transmits light. A transflective film is located outside of the second transparent substrate of the liquid crystal display panel around a location corresponding to the light transmitting hole, and is made of a transmissive material with reflective material scattered thereon, such that reflective material reflects light and the transmissive material transmits light. A back light device supplies light toward the transflective film.

15 Claims, 4 Drawing Sheets

TRANSFLECTIVE LIQUID CRYSTAL DISPLAY DEVICE

CROSS REFERENCE

This application claims the benefit of Korean Patent Application No. 1999-29221, filed on Jul. 20, 1999, under 35 U.S.C. § 119, the entirety of which is hereby incorporated by reference.

BACKGROUND

1. Field of the Invention

The present invention relates to a liquid crystal display (LCD) device, and more particularly, to a transflective LCD device.

2. Description of Related Art

In general, liquid crystal displays are divided into transmissive LCD devices and reflective LCD devices according to whether the display uses an internal or an outer light source.

A typical transmissive LCD device comprises a liquid crystal panel and a back light device. The liquid crystal panel includes upper and lower substrates with a liquid crystal layer interposed therebetween. The upper substrate has a color filter, and the lower substrate has a thin film transistor (TFT) as a switching element. An upper polarizer is arranged on the upper substrate of the liquid crystal panel, and a lower polarizer is arranged between the lower substrate of the liquid crystal panel and the backlight device.

At this time, the two polarizers have a transmittance of 45%, the two substrates have a transmittance of 94%, the TFT array and the pixel have a transmittance of 65%, and the color filter has a transmittance of 27%, respectively. Therefore, the transmissive LCD device gets to have a transmittance of about 7.4% as seen in FIG. 1, which shows transmittance after light passes through each of the layers. For such a reason, the transmissive LCD device requires a high brightness, and thus electric power consumption by the backlight device increases. In order to supply sufficient power to the backlight device, a relatively heavy battery is employed, and there still exists a problem that the battery can not be used for a long time.

In order to overcome the problem described above, the reflective LCD has been developed. Since the reflective LCD device uses ambient light, it is easy to carry. Also, the reflective LCD device is superior in aperture ratio than the transmissive LCD device.

FIG. 2 is a plan view illustrating a typical reflective LCD device. As shown in FIG. 2, the reflective LCD device 100 includes gate lines 6 and 8 arranged in a transverse direction, data lines 2 and 4 arranged in a longitudinal direction perpendicular to the gate lines 6 and 8, and thin film transistors "S" (TFTs) near cross points of the gate line 8 and the data line 2. Each of the TFTs "S" has a gate electrode 18, a source electrode 12 and a drain electrode 14. The data electrode 18 extends from the data line 2, and the gate electrode 18 extends from the gate line 8. The reflective LCD device 100 further includes reflective electrodes 10. The reflective electrode 10 is electrically connected with the drain electrode 14 through a contact hole 16 and is made of a metal having a good reflectance.

By the way, the reflective LCD device has a problem that it is affected by its surroundings. For example, the brightness of ambient light in an office differs largely from that of the outdoors. Also, even in the same location, the brightness of ambient light depends on the time of day (e.g., noon or dusk).

In order to overcome the problem described above, a transflective LCD device has been developed. FIG. 3 shows a conventional transflective LCD device. As shown in FIG. 3, the conventional transflective LCD device includes lower and upper substrates 50 and 60 with a liquid crystal layer 80 interposed therebetween. The upper substrate 60 has a color filter 61, and the lower substrate 50 has a switching element (not shown), a pixel electrode 54 and a reflective electrode 52. The reflective electrode 52 is made of a opaque conductive material having a good reflectance and includes light transmitting holes 53 formed therein. The transflective LCD device further includes a backlight device 70. The light transmitting holes 53 serve to transmit light 112 from the backlight device 16.

The transflective LCD device is operable in both a transmissive mode and a reflective mode. First, in the reflective mode, the incident light 74 from the upper substrate 22 is reflected on the reflective electrode 52 and directs toward the upper substrate 22 again. At this time, when the electrical signals are applied to the reflective electrode 52 by the switching element (not shown), phase of the liquid crystal layer 80 varies and thus the reflected light is colored by the color filter 61 and displayed in the form of colored light.

Further, in the transmissive mode, light 72 generated from the backlight device 70 passes through portions of the pixel electrode 54 corresponding to the transmitting holes 53. At this time, when the electrical signals are applied to the pixel electrode 54 by the switching element (not shown), phase of the liquid crystal layer 80 varies. Thus, the light 72 passing through the liquid crystal layer 80 is colored by the color filter 61 and displayed in the form of images with other colored lights.

As described above, since the transflective LCD device has both the transmissive mode and the reflective mode, the transflective LCD device can be used without depending on the time of day (e.g., noon or dusk) and has advantages that it can be used for a long time with consuming a low power.

However, since the reflective electrode 52 has a plurality of the transmitting holes 53, the conventional transflective LCD device has a very low light utilizing efficiency compared to the reflective LCD device or the transmissive LCD device. For example, it should be noted that the number of the circular-shaped light transmitting hole 53 having a diameter of $\Delta L$ is "n" an area of one light transmitting hole 53 is "$(\pi \Delta L^2)/4$", and thus a total area of all light transmitting holes 53 gets to be "$n \times (\pi \Delta L^2)/4$". As a result, the light utilizing efficiency of the transmissive mode and that of the reflective mode are in inverse proportion according to the total area of the light transmitting holes 53. In other words, if a total area of the light transmitting holes 53 is reduced in order to increase the light utilizing efficiency in the reflective mode, in proportion to the reduced area of the holes 53, the light utilizing efficiency in the transmissinve mode gets to be reduced.

For the foregoing reasons, there is a need for a transflective LCD device having a good utilizing efficiency in both the transmissive mode and the reflective mode.

SUMMARY OF THE INVENTION

To overcome the problems described above, preferred embodiments of the present invention provide a transflective LCD device having a good utilizing efficiency in both the transmissive mode and the reflective mode.

More particularly, the preferred embodiments of the present invention provide a transflective LCD device having a good utilizing efficiency in the reflective mode.

In order to achieve the above object, the preferred embodiment of the present invention provides a transflective liquid crystal display device, including a liquid crystal display panel, a transflective film, and a backlight device. The liquid crystal display panel has a first transparent substrate, a second transparent substrate, and a liquid crystal layer interposed between the first and second transparent substrates. The first transparent substrate has a color filter and the second transparent substrate has a pixel electrode and a reflector. The reflector has a light transmitting hole which the pixel electrode covers. The light transmitting hole transmits light. The transflective film is located outside of the second transparent substrate of the liquid crystal display panel around a location corresponding to the light transmitting hole. The transflective film is made of a transmissive material with reflective material scattered on the upper surface of the transmissive material. The reflective material reflects light, and the transmissive material transmits light. The back light device supplies light toward the transflective film.

The reflective material of the transflective film is selected from a group consisting of Ag and Al, and the transflective matrial of the transflective film is an acrylic-based resin. The reflector is made of an opaque conductive material, and the pixel electrode is made of indium tin oxide (ITO).

BRIEF DESCRIPTION OF THE DRAWINGS

For a more complete understanding of the present invention and the advantages thereof, reference is now made to the following descriptions taken in conjunction with the accompanying drawings, in which like reference numerals denote like parts, and in which.

DETAILED DESCRIPTION OF PREFFERED EMBODIMENTS

Reference will now be made in detail to the preferred embodiment of the present invention, example of which is illustrated in the accompanying drawings.

Figure 5:
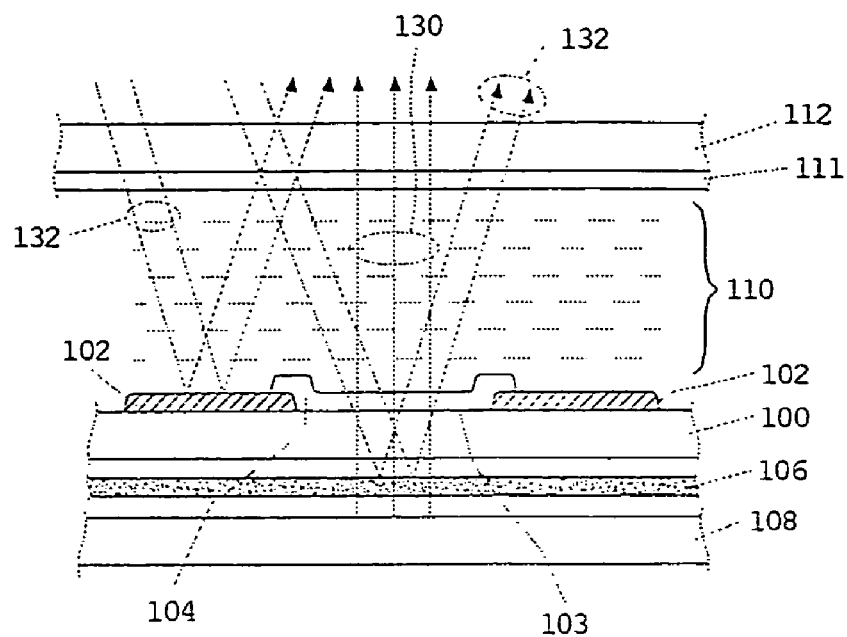
FIG. 5 is a cross-sectional view illustrating a transflective liquid crystal display device according to a preferred embodiment of the present invention.

FIG. 5 is a cross-sectional view illustrating a transflective liquid crystal display device according to a preferred embodiment of the present invention. As shown in FIG. 5, a transflective liquid crystal display device according to a preferred embodiment of the present invention includes a liquid crystal display panel and a back light device 108. The liquid crystal display panel includes lower and upper substrates 100 and 112 with a liquid crystal layer 110 interposed therebetween. The upper substrate 112 has a color filter 111, and the lower substrate 100 has a switching element (not shown), a pixel electrode 104 and a reflective electrode 102. The reflective electrode 102 is made of an opaque conductive material having a good reflectance and includes light transmitting holes 103 formed therein. The pixel electrode is made of a transparent conductive material such as indium tin oxide (ITO), and may be located on or under the light transmitting holes 103, overlapping a portion of the reflective electrode 102. The transflective LCD device further includes a transflective film 106 arranged between the lower substrate 100 and the back light device 108. The light transmitting holes 103 serve to transmit light 130 from the backlight device 108. The transflective LCD device further includes an upper polarizer (not shown) on the upper substrate 112 and a lower polarizer (not shown) located between the lower substrate 100 and the transflective film 106.

Figure 6:
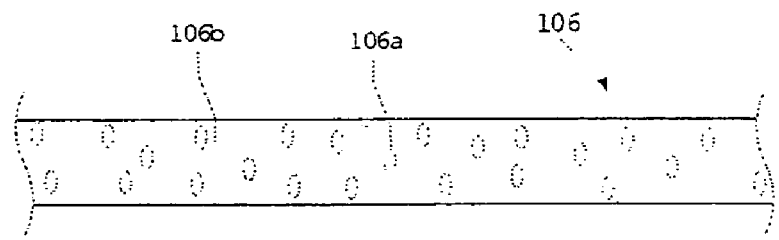
FIG. 6 is a front view illustrating a structure of a transflective film according to the preferred embodiment of the present invention.

The transflective film 106, as shown in FIG. 6, has a reflective portion 106*a* on the upper surface thereof and a transmissive portion 106*b*. In other words, the reflective materials 106*a* are scattered on the upper surface of the transmissive material 106*b*. However, the reflective materials 106*a* may be scattered in the inner surface of the transmissive material 106*b*. It is preferred that the reflective portion 106*a* is made of a reflective material such as Ag and Al and that the transmissive portion 106*b* is made of an acrylic-based resin. That is, the transflective film 106 is made of the acrylic-based resin on which the reflective materials are scattered. The reflective portion 106*a* made of Ag and Al serves to reflect the incident light 132 from the outside along with the reflective electrode 102 in the reflective mode. The transflective portion 106*b* serves to transmit the light 130 from the backlight device 108 in the transmissive mode.

Further, a concentration of the reflective material 106*a* scattered on the upper surface of the acrylic-based resin 106*b* is adjustable. Therefore, since the LCD devices for use in a mobile phone, a personal digital assistants (PDA) and a portable notebook computer uses the reflective mode as a main mode, by increasing an amount of the reflective material 106*a* scattered on the acrylic-based resin 106*b*, the transflective LCD device having the reflective mode as the main mode can be manufactured. Alternatively, by decreasing an amount of the reflective material 106*a* scattered on the acrylic-based resin 107*b*, the transflective LCD device having the transmissive mode as the main mode can be manufactured.

The transflective LCD device described above is operated as follows. First, in the reflective mode, the incident light 132 from the upper substrate 112 is reflected on the reflective electrode 102 and the reflective portion 106*a* of the transflective film 106, and then directs toward the upper substrate 112 again. That is, since the incident light 132 from the outside is reflected on the reflective portion 106*a* of the transflective film 106 as well as the reflective electrode 102, an aperture ratio and the light utilizing efficiency in the reflective mode are much improved.

Figure 1:
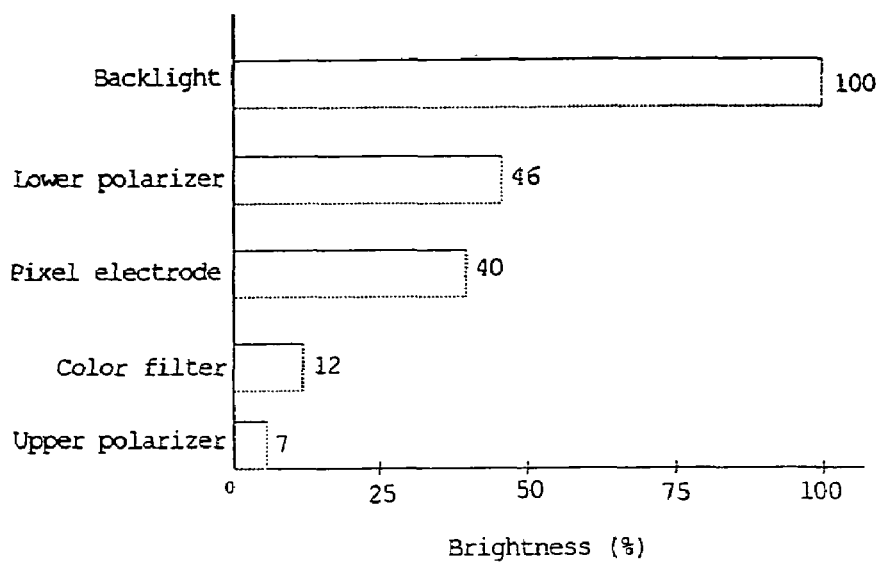
FIG. 1 is a graph illustrating a transmittance after light passes through each layers of a conventional liquid crystal display device.
Figure 2:
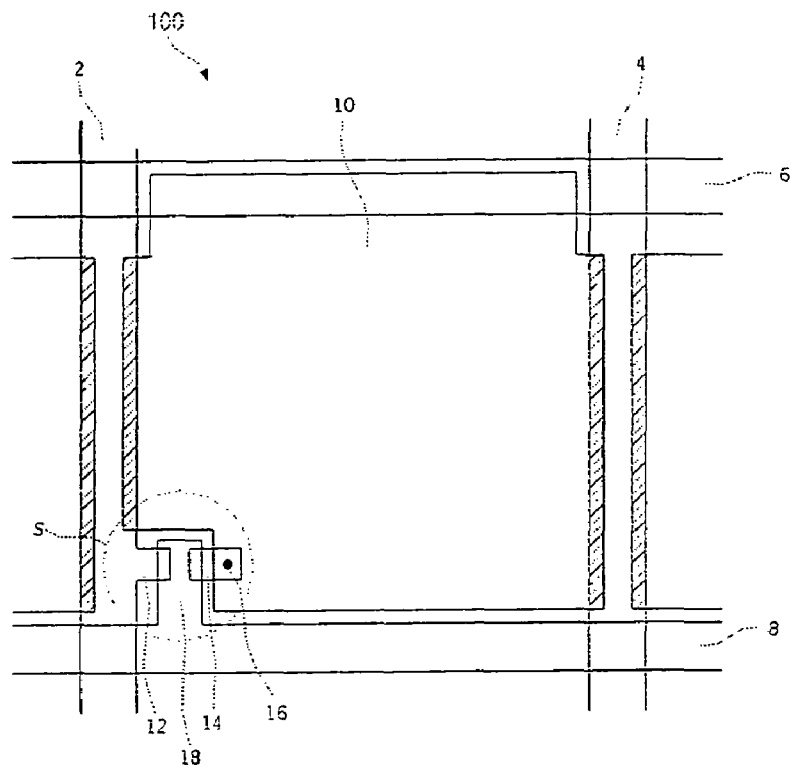
FIG. 2 is a plan view illustrating a conventional reflective liquid crystal display device.
Figure 3:
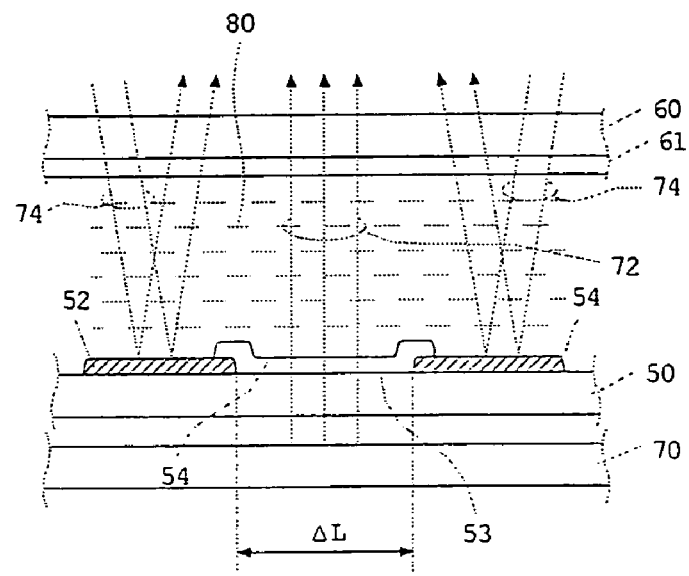
FIG. 3 is a cross-sectional view illustrating a conventional transflective liquid crystal display device.
Figure 4:
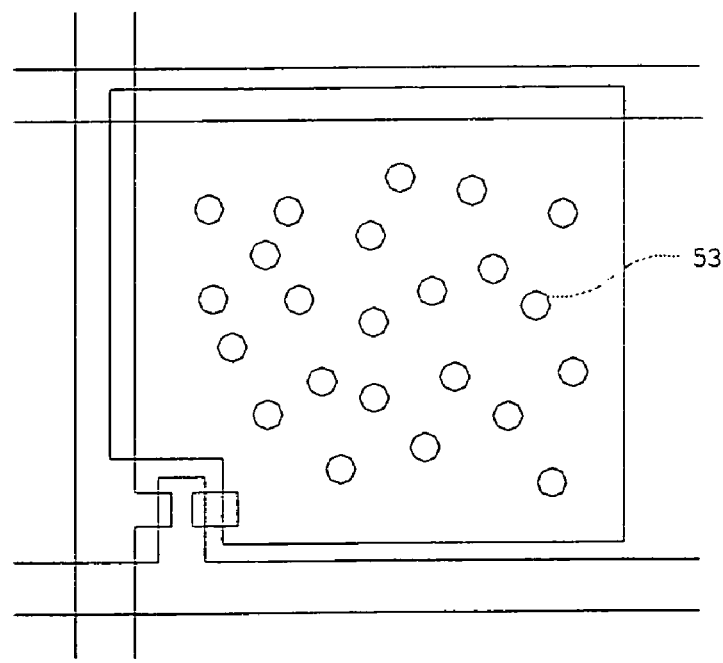
FIG. 4 is a plan view illustrating the conventional transflective liquid crystal display device of FIG. 3.

Further, in the transmissive mode, light 130 from the backlight device 70 passes through the transmissive portion 106*b* of the transflective film 106 and a portion of the pixel electrode 54 corresponding to the transmitting holes 103. That is, if it is noted that the diameter of the light transmitting holes 103 is same as that of the conventional art shown in FIG. 4, an aperture ratio gets to be same as that of the conventional art.

Furthermore, when the transmissive mode and the reflective mode are operated at the same time, the transflective LCD device can have a better light utilizing efficiency. For example, when the transflective LCD device is used in dusk room in which a brightness of light is bad more or less, the user can operate the transmissive mode and the reflective mode at the same time and thus the light utilizing efficiency can be improved remarkably.

Figure 7:
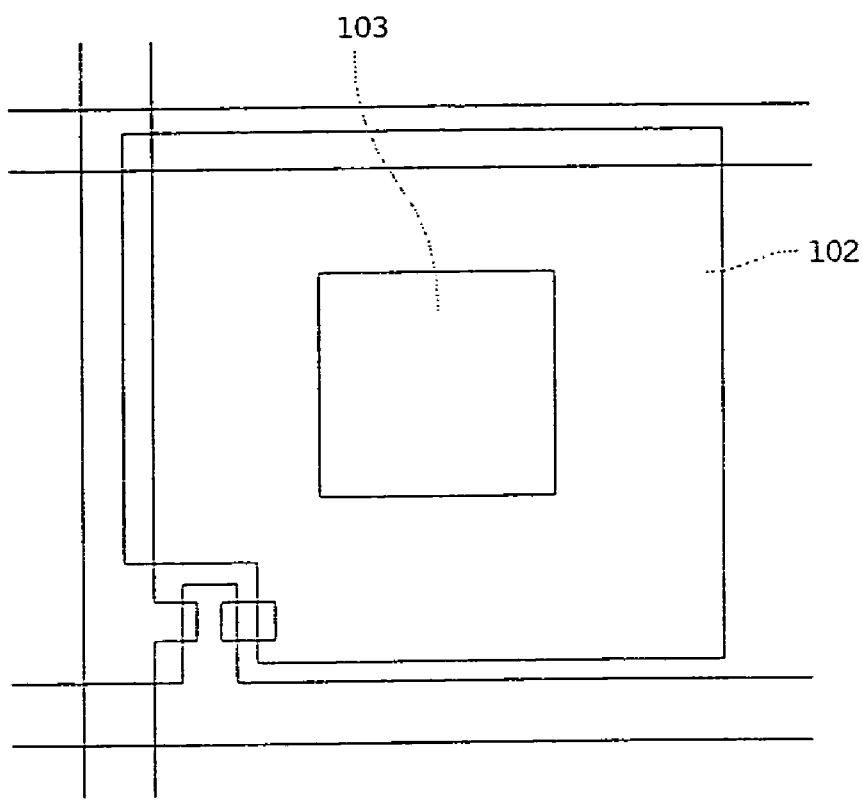
FIG. 7 is a plan view illustrating an exemplary structure of a reflective electrode of the transflective liquid crystal display device according to the preferred embodiment of the present invention.

The light transmitting holes 103 may have a circular shape, a rectangular shape as shown in FIG. 7 or other shapes. The light transmitting holes 103 formed in the reflective electrode 102 does not have a limitation to its size and its location. For example, the light transmitting holes 103 separated from the reflective electrode 102 may be formed.

As described above, using the transflective LCD device according to the preferred embodiment of the present invention, since an amount of the transmitted or reflected light can be controlled by increasing or decreasing an amount of the reflective material contained in the acrylic-based resin of the transflective film, the light utilizing efficiency in the reflective mode or the transflective mode can be much improved. More particularly, the transflective LCD device having a good utilizing efficiency in the transmissive mode can be obtained. Further, the transflective LCD device having the reflective mode or the transflective mode as the main mode can be easily manufactured.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A transflective liquid crystal display device, comprising:
   a transflective liquid crystal display panel having a first transparent substrate, a second transparent substrate, and a liquid crystal layer interposed between the first and second transparent substrates, the first transparent substrate having a color filter, the second transparent substrate having a plurality of pixel regions, a pixel electrode and a reflector, the reflector having a light transmitting hole which the pixel electrode covers, the light transmitting hole transmitting light;
   a transflective film located outside of the second transparent substrate of the liquid crystal display panel around a location corresponding to the light transmitting hole, the transflective film being made of a transmissive material with reflective material scattered on only the surface of the transmissive material, the reflective material reflecting light, the transmissive material transmitting light; and
   a back light device for supplying light toward the transflective film;
      wherein each pixel region is divided into reflective and transmissive portions, and a reflection brightness of the transflective liquid crystal display device is improved due to a first reflected light at the reflector of the reflective portion and a second reflected light at the transflective film of the transmissive portion, and a concentration of the reflective material scattered on the surface of the transmissive material is adjusted according to a main mode of the transflective liquid crystal display device.

2. The transflective liquid crystal display device of claim 1, wherein the reflective material of the transflective film is selected from the group consisting of Ag and Al.

3. The transflective liquid crystal display device of claim 1, wherein the transmissive material of the transflective film is an acrylic-based resin.

4. The transflective liquid crystal display device of claim 1, wherein the reflector is made of an opaque conductive material.

5. The transflective liquid crystal display device of claim 1, wherein the pixel electrode is made of indium tin oxide (ITO).

6. The transflective liquid crystal display device of claim 1, wherein the transflective liquid crystal display device has a reflective main mode, and the concentration of the reflective material is increased.

7. The transflective liquid crystal display device of claim 1, wherein the transflective liquid crystal display device has a transmissive main mode, and the concentration of the reflective material is decreased.

8. The transflective liquid crystal display of claim 1, wherein the hole has a circular shape or a rectangular shape.

9. A transflective liquid crystal display device, comprising:
   a transflective liquid crystal display panel having a first transparent substrate, a second transparent substrate, and a liquid crystal layer interposed between the first and second transparent substrates, the first transparent substrate having a color filter, the second transparent substrate having a plurality of pixel regions, a pixel electrode and a reflector, the reflector having a light transmitting hole which the pixel electrode covers, the light transmitting hole transmitting light;
   a transflective film located outside of the second transparent substrate of the liquid crystal display panel around a location corresponding to the light transmitting hole, the transflective film being made of an acrylic-resin based transmissive material with reflective material scattered on only the surface of the transmissive material, the reflective material reflecting light, the transmissive material transmitting light; and
   a back light device for supplying light toward the transflective film;
      wherein each pixel region is divided into reflective and transmissive portions, and a reflection brightness of the transflective liquid crystal display device is improved due to a first reflected light at the reflector of the reflective portion and a second reflected light at the transflective film of the transmissive portion, and a concentration of the reflective material scattered on the surface of the transmissive material is adjusted according to a main mode of the transflective liquid crystal display device.

10. The transflective liquid crystal display device of claim 9, wherein the reflective material of the transflective film is selected from the group consisting of Ag and Al.

11. The transflective liquid crystal display device of claim 9, wherein the reflector is made of an opaque material.

12. The transflective liquid crystal display device of claim 9, wherein the pixel electrode is made of indium tin oxide (ITO).

13. The transflective liquid crystal display device of claim 9, wherein the transflective liquid crystal display device has a reflective main mode, and the concentration of the reflective material is increased.

14. The transflective liquid crystal display device of claim 9, wherein the transflective liquid crystal display device has a transmissive main mode, and the concentration of the reflective material is decreased.

15. The transflective liquid crystal display of claim 9, wherein the hole has a circular shape or a rectangular shape.

* * * * *